United States Patent
Greenaway et al.

(10) Patent No.: US 6,547,406 B1
(45) Date of Patent: Apr. 15, 2003

(54) INFRA-RED IMAGING SYSTEMS AND OTHER OPTICAL SYSTEMS

(75) Inventors: Alan H. Greenaway, Malvern (GB); Paul Harrison, Malvern (GB); Robin Dickson, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/529,671

(22) PCT Filed: Oct. 19, 1998

(86) PCT No.: PCT/GB98/03107

§ 371 (c)(1),
(2), (4) Date: May 2, 2000

(87) PCT Pub. No.: WO99/21043

PCT Pub. Date: Apr. 29, 1999

(30) Foreign Application Priority Data

Oct. 18, 1997 (GB) .............................................. 9721991

(51) Int. Cl.⁷ ............................ G02B 5/08; G02B 7/182
(52) U.S. Cl. ...................................... 359/846; 359/354
(58) Field of Search ................................ 359/354, 846, 359/862, 863, 666, 355, 358; 250/206.1, 206.3

(56) References Cited

U.S. PATENT DOCUMENTS 4,271,355 A * 6/1981 Wisner et al. .............. 250/201
4,836,661 A    6/1989 Ikemori
4,846,561 A    7/1989 Soileau, Jr. et al.
5,018,842 A    5/1991 Chen
5,350,911 A * 9/1994 Rafanelli et al. ........ 250/201.9
5,373,151 A * 12/1994 Eckel et al. ................ 250/208

FOREIGN PATENT DOCUMENTS

| CA | 2144482 | 9/1996 |
|---|---|---|
| EP | 0 199 650 A1 | 10/1986 |
| EP | 0 647 064 A1 | 4/1995 |
| FR | 2 519 151 | 7/1983 |

* cited by examiner

Primary Examiner—Cassandra Spyrou
Assistant Examiner—Alessandro V. Amari
(74) Attorney, Agent, or Firm—Nixon & Vanderhye P.C.

(57) ABSTRACT

An infra-red imaging system has two variable focal length optical components (6, 7) whose positions are fixed relative to one another. The system also comprises an image detector (8). Control means (13) is provided such that the focal length of one of the variable focal length optical components (7) can be varied in relation to the focal length of the other variable focal length optical component (6). The system can be used to produce an image of variable magnification while maintaining an in-focus image at the detector (8). The control means (13) may comprise a mechanical linkage, an electronic circuit, or a computer program. In an alternative embodiment the optical system is a beam expander. Controlling a focusing mirror can achieve a dither effect. Controlling a focusing mirror can also de-focus the image, giving a mean scene temperature evaluation.

47 Claims, 7 Drawing Sheets

INFRA-RED IMAGING SYSTEMS AND OTHER OPTICAL SYSTEMS

BACKGROUND OF THE INVENTION

1. Field of the Invention

This invention relates to infra-red (e.g. thermal) imaging systems and to other optical systems, and in particular to optical systems in which at least two optical parameters can be controlled relative to one another.

2. Discussion of Prior Art

It is known to produce optical systems comprising two or more optical components of fixed focal length in which variation of at least two optical parameters of the system is achieved by moving two or more of the optical components relative to one another.

For example it is known to produce a variable magnification compound lens comprising at least two optical components of fixed focal length wherein the overall optical magnification of the system is varied by adjusting the spacing between the optical components whilst an in-focus image is maintained on a fixed image plane by relatively varying the distance from the final optical component to the fixed image plane.

The technology used in such systems is well developed and provides acceptable results in most applications. However, the mass and response time of these systems can be adversely affected by the need to physically move the optical components. Furthermore, for critical applications, especially in spacecraft optics, moveable optical components require complex counterbalancing arrangements.

It has also been known for nearly ten years from U.S. Pat. No. 4,836,661 to propose a refractive variable magnification system for zoom lenses in which a number of refractive lenses of variable refractive power are provided a fixed distance apart and are used to focus an image onto a fixed image plane.

U.S. Pat. No. 4,890,903, published in 1990, discloses a lens unit having variable focus refractive lenses which can be bodily rotated to alter their focal length, and which are gas or fluid filled. One lens have a positive power and the other a negative power. Uses in spectacles and cameras are disclosed.

U.S. Pat. No. 4,630,903 shows a complex multi-refractive lens system for a photocopies. it requires the ability to vary 3 system parameters from 6 in a refractive system.

It has also been known for many years in the field of thermal imaging to have detector, usually pixellated, upon which an image is focused and provided with a chopper whose function is to cause that image to dither over the detector, and to present a periodic reference signal to the detector. A typical chopper has three segments: a first transmissive prism, a second transmissive prism, and an opaque shutter region, the two prism sections causing an image to fall upon slightly different regions of the detector, and the shutter region providing a black body reference signal which can be used to allow the output voltage of a pixel to fall away from a scene-dependent value.

A paper by N. Butler, J. McClelland and S. Iwasa, employees of Honeywell, entitled "Ambient Temperature Solid State Pyroelectric I.R. Imaging Arrays", dated March 1988, NE 8701-02 (SPIE), discusses using a de-focusing chopper having a thick transparent "blurring" portion.

It has also been known to compensate for movement of a detected image relative to a sensor/sensor array by introducing special, and additional, components into the optics of an imaging system, for example to compensate for atmospheric alteration, and camera shake.

SUMMARY OF THE INVENTION

According to a first aspect of the present invention there is provided an optical system comprising two or more variable focal length optical components whose positions are fixed relative to one another; the system further comprising control means for varying the focal length of at least one of the said variable focal length optical components in relation to the focal length of at least one of the other said variable focal length optical components such that, in use, control over at least two optical parameters if the system is achieved.

The invention overcomes the drawbacks of much of the prior art because variation of certain optical parameters of the system can be achieved without the need to change the relative positions of the optical components within the system, i.e. without the need to, for example, move the optical components bodily, as a whole, towards or away from each other, or to rotate bodily the optical components. As a result system reprogramming can be achieved in time-scales shorter than those required for physical movement of the positions of the optical components, this being of particular benefit in active optical systems. (By active optical system it is meant an optical system in which the focal lengths of the optical components are varied in real time according to predictions regarding the required focal lengths, as opposed to being controlled by a feedback loop.) Furthermore, if the power supplies required for varying the focal length of the optical components are of low-mass design, then the overall mass of the system may be lower than for a conventional system due to the lack of mechanical positioning gear. Also the need for complex counterbalancing requirements is eliminated for critical applications such as spacecraft optics.

The optics may be used in a beam expander; or in a zoom lens unit; or in a camera; or in binoculars or a telescope. The optics may be reflective. An all-reflective optics device may be provided.

The control means in an optical system according the first aspect of the invention may comprise a mechanical linkage, electronic circuit or a computer program.

An optical system according to the first aspect of the invention may further have an image plane fixed relative to the said variable focal length optical components in the system.

One optical parameter that may be controlled is the magnification of the system. Alternatively, the focal lengths of the first and second components may be the two controlled parameters. Tilt means may be provided to apply a two-axis tilt to one or more of the optical components. De-focusing means may be provided to de-focus the image received by the detector/detector array.

In one application of an optical system according to the first aspect of the invention, variation of the focal length of at least one of the said variable focal length optical components in relation to the focal length of at least one of the other said variable focal length optical components varies the position of a principle plane of the system in dependence on a change in effective focal length of the compound system such that an image of variable magnification is obtained with maintenance of a substantially in-focus image in a fixed image plane.

In a further application of an optical system according to the first aspect of the invention, variation of the focal length of at least one of the said variable focal length optical components in relation to the focal length of at least one of the other said variable focal length optical components may vary the width of an optical beam whilst substantially maintaining collimation of the beam.

According to a second aspect of the present invention there is provided an optical system for varying the width of an optical beam, comprising two or more variable focal length optical components whose positions are fixed relative to one another, and control means for varying the focal length of at least one of the said variable focal length optical components in relation to the focal length of at least one of the other said variable focal length optical components such that, in use, the width of the optical beam is varied whilst substantially maintaining the collimation of the beam.

The width of the optical beam may be expanded, or may be contracted.

The optical components may comprise refractive optical components, or may comprise reflective optical components, such as mirrors.

According to a third aspect of the invention there is provided a variable magnification zoom lens unit comprising two or more variable focal length optical components whose positions are fixed relative to one an other and to an image plane of the lens unit; the lens unit further comprising means for varying the focal length of at least one of the variable focal length optical components relative to the focal length of at least one other of the variable focal length optical components such that, in use, an image of variable magnification can be obtained with maintenance of a substantially in-focus image in the fixed image plane.

According to a fourth aspect of the invention there is provided a method of controlling at least two optical parameters of an optical system having two or more optical components comprising the steps of:

a) fixing the positions of at least two of the optical components relative to one another; and, b) relatively varying the focal length of at least two of the said fixed position optical components.

According to a fifth aspect of the present invention there is provided an optical system comprising at least first and second variable focal length reflective optical components whose positions are fixed relative to one another; the system further comprising control means for varying the focal length of the first optical component and for varying the focal length of the second optical component, the control means being capable of controlling the first and second variable focal length reflective optical components so as to achieve a change in relative focal length between the first and second components such that, in use, control over at least two optical parameters of the system is achieved.

The optical system preferably operates over a wide spectral range, for example from 450 nm to 10,000 nm. A silvered mirror has a reflectivity of about 0.9 at a wavelength of 450 nm and a reflectivity of 0.99 at a wavelength of 10,000 nm. The optical system has a focal plane which is preferably at the same place for all wavelengths over which the system is designed to operate. This is to be compared with optical systems using refractive optical components, where it is difficult to find a material for the components which has good transparency over a wide spectral range, and such systems are generally achromatic i.e. their focal plane is the same for just a very narrow band of wavelengths.

The optical system is preferably light. Reflective optics offer significant weight saving over equivalent refractive, perhaps 20%, or 50% saving.

Each individual reflective optical component preferably has a high a transmission as possible, for example 0.95 or more, or 0.975 or more, or 0.985 or more, even 0.99 or more. A compounded system compounds up the losses and so if several optical elements are used it is desirable to use as many with high transmission as possible.

The optical system may further comprise an image plane fixed relative to the first and second variable focal length reflective optical components.

The optical components, which are preferably reflective, may also be used to stabilise an optical beam incident on the system. This can be used to reduce the problem of handshake when the optical system is used in a camera and/or reduce the effects of atmospheric aberration/compensate for other effects.

One or more of the reflective optical components may comprise a mirror. The control means may comprise a mechanical linkage, electronic circuit or a computer program. The or each reflective optical component may be deformed to vary its focal length.

Variation of the focal lengths of the reflective optical components is preferably carried out at high speeds, for example of the order of 10 Hz or more, 20 Hz or more, 40 Hz or more, or even 60 or 100 Hz or more.

One of the optical parameters controlled by the optical system may be the magnification of the system. The magnification achieved by the system may be variable by a factor of 3 or more, or 5 or more, or even 10 or more. The magnification may be variable between ×1 and, say, ×10 or ×15, or above.

Tilt means, such as mirror manipulation means, may be used to apply a tilt of at least one of the optical components about at least one axis. The tilt means may apply a two-axis-tilt to one or more of the reflective optical components, for example when magnification of the optical system is controlled. This may ensure that the optical axis of the system is maintained during magnification.

The optical system may be used in a magnification, or zoom, unit. The magnification unit may be used in conjunction with a camera.

Two or more optical systems may be used in conjunction with each other. One input may be supplied to such a 'stacked' optical system, the same input may be used to control both of the control means of the stacked system (or different control signals may be provided).

According to a sixth aspect of the present invention, there is provided an imaging system comprising an image detector and an optical system according to any preceding aspect of the present invention.

The imaging system may further comprise de-focusing means to de-focus one or more of the, preferably reflective, optical components. This de-focuses the image on the detector, which minimises reflection from the detector surface. When the imaging system is to be used with a laser, this may also reduce the laser energy density at the detector surface and hence reduces the risk of damage of the detector by the laser. The de-focusing means may be used to de-focus one or more of the, preferably reflective, optical components when the detector is not in use. Control means may ensure that for a substantial part (e.g. at least ¼ or ⅓ of the time or at least ½ of the time, or at least ¾ of the time) of the duty cycle of the detector (or detector array) the image incident upon the detector is significantly de-focused (e.g. a nominal focused spot may be de-focused to have an increase in area of 50% or more, 100% or more, 200% or more, 400% or more, 1,000% or more.

Means may be provided to detect an incident beam that is more intense than a predetermined threshold and automatically de-focus the optical system, at least for the pixel or pixels that would otherwise receive radiation above the threshold intensity. The entire image may be de-focused in response to a signal of too great an intensity.

It may be desirable to have none, or only one or two refractive components in the beam path (they are less transmissive than reflective components).

In order to minimise the risk of damage to a detector pixel in a detector array an incident image may be de-focused practically all of the time, without significant loss of image quality from the detector array if the degree of de-focus is controlled to match the system resolution. The output resolution of a pixellated array is controlled in part by the pixel size and geometry—there is little benefit in having input optical resolution better than the pixel output resolution. It is possible to take advantage of this by having the optics deliberately de-focus the image incident onto the detector array to the extent consistent with not degrading too much the output signals/picture of the array. FIG. 10 illustrates this. For any particular level of magnification the degree of desirable de-focus may be different—at higher magnification less deliberate de-focus may be desirable as resolution may already be challenged.

According to another aspect the invention comprises an infra-red detecting device comprising an infra-red detector and an optical system which comprises at least a first and a second variable focal length optical components, preferably reflective components, whose positions are fixed relative to one another, and control means for varying the focal length of the first or second variable focal length optical component in relation to the focal length of the other of the said variable focal length optical components, such that, in use, control over at least two optical parameters of the optical system is achieved.

Preferably the device is an I.R imaging device, and it is preferably a thermal I.R. device. Thermal wavelengths may be considered to be about 3 to 14 microns.

The optical parameters controlled are preferably the focal lengths of the first and second optical components.

The thermal imaging system may further comprise reference means for providing a reference signal to the detector. De-focus means may be provided for controlling one or more of the optical components so as to cause the image of the scene received by the detector to be de-focused.

The de-focusing means may comprise the referencing means. If the scene image is substantially completely de-focused, the de-focused image of the scene may be indicative of the mean background temperature of the scene. It has long been desirable to produce a reference signal (periodically) that has a relationship with the captured scene, such as a signal indicative of the mean scene temperature, but hitherto the reference signal from mechanical choppers have typically been indicative of the camera temperature. Each pixel of a detector array of pixels will receive a mean scene temperature input if the scene image is fully de-focused (e.g. the input of the system is focused onto the detector array).

The infra-red imaging system may alternatively or additionally comprise dither means to manipulate the first or second optical component (or first and second optical component) between two configuration(s) so as to cause the detected image to dither between two positions on the detector. The dither means may change the shape of the optical component, e.g. mirrors, at a rate of 10 to 50 Hz, preferably 20 Hz±10 Hz, or 30 Hz±20 Hz. This allows two slightly differently focused images of the scene to be incident on the detector. This is conventionally achieved by using the two prism sections of a chopper device. This is A.C. coupling of the scene signal. It is important in some I.R. imaging systems to A.C. couple the detector signals to reduce noise.

It is also possible to control the shape of the two optical components so as to compensate for image aberration/camera shake/other effects without the need to have additional specific dedicated compensating optics—i.e. the same optics that controls the magnification/zoom can be used to compensate for other effects. This can reduce weight and complexity.

There may be only two optical elements of variable focal length on the apparatus. There may be no other focusing optical elements. Alternatively, one or two (or more) additional optical components (reflective or refractive) may be provided for example to compensate for aberration and/or wide angle light collection (e.g. a Schmidt corrector).

According to another aspect, the invention comprises a method of providing A.C. coupling (or dither) in an electronic imaging detector comprising controlling a mirror (or lens) upon which radiation from the incident scene is incident so as to at one point in time direct an image to one position on an imaging detector, moving the mirror so as to direct the image at a second point in time to a different position on the imaging detector, and moving the mirror so as to repeatedly dither the image on the imaging detector, and in which the mirror (or lens) is distorted to achieve the effect rather than being bodily moved longitudinally or bodily rotated.

Preferably the mirror (or lens) is controlled so as to direct de-focused radiation from the scene onto the imaging detector. Preferably the de-focused radiation is substantially completely de-focused so as to present mean scene radiation to the detector. Preferably the mean scene radiation is periodically directed on the detector and is used as a reference in processing detected signals from the detector array.

The mirror may also be used to focus the image onto the imaging detector. The mirror may be part of zoom magnification optics and may be used at times to zoom the magnification of the image incident upon the imaging detector.

The method may also preferably comprise providing another focusing optical element in addition to the mirror (or lens) having the mirror, other focusing element and imaging detector fixed distances from each other, zoom being achieved by varying the focal length of the other optical element and the mirror (or lens).

The mirror may also be used to compensate for vibrations or movement. The other optical element is preferably bigger than the mirror and may be moved or perturbed less often, or at a slower rate, than is the smaller mirror. Radiation may be incident upon the other optical element before it is incident upon the mirror.

According to another aspect the invention comprises a method of providing a periodic reference signal in an electronic imaging detector comprising operating the detector in a mean scene mode from time to time in which a mirror (or lens) is controlled to de-focus completely, or substantially completely, radiation from a scene so that radiation incident upon the imaging detector is uniform, and using a signal produced by the detector during this mean scene radiation mode of operation as a mean scene reference signal, and controlling the mirror (or lens) to return to an imaging mode of operation after the reference has been obtained.

The detector preferably switches to mean scene reference mode with a regular periodicity, preferably of the order of many times per second.

According to another aspect, the invention comprises a method of minimising damage to detectors in an optical system and retro-reflection from an optical detector system, the method comprising operating optical focusing components of the system in a de-focus mode in which the captured radiation incident upon a detecting element is significantly defocused.

BRIEF DESCRIPTION OF THE DRAWINGS

Several embodiments of the invention will now be described, by way of example only, with reference to the drawings, in which.

DETAILED DISCUSSION OF PREFERRED EMBODIMENTS

Figure 1:
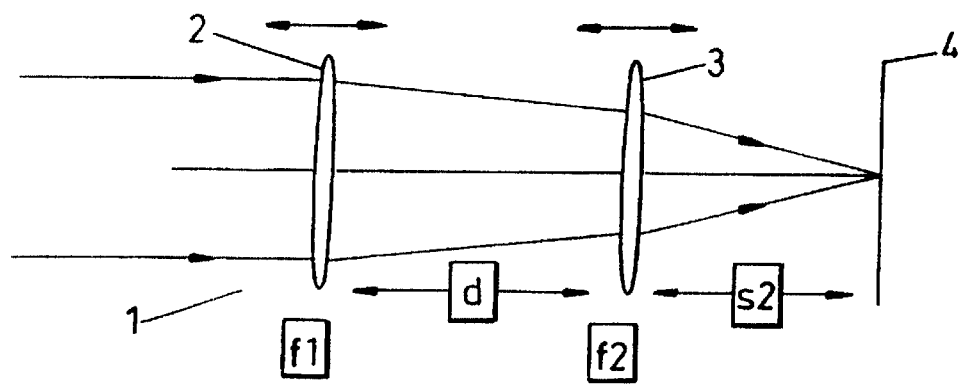
FIG. 1 shows, schematically, a variable magnification optical system according to the invention.

FIG. 1 shows a compound lens system 1 according to the invention comprising a first lens 2 of variable focal length $f_1$ and a second lens 3 of variable focal length $f_2$. The positions of the lenses 2,3 are fixed relative to one another and with respect to the image plane 4 of the system. The spacing between the lenses, d, is therefore fixed, as is the distance, $S_2$, from the plane of the second lens 3 to the image plane 4. As a result of fixing the positions of the lenses 2,3 and the image plane 4 relative to one another, for any value of $f_1$ there is only one possible value of $f_2$ that will provide an in focus image at the image plane 4. For any particular value of $f_1$, the following equations can be used to calculate $f_{eff}$, the effective focal length of the system, $f_2$ and m, the angular magnification of the system.

$$f_{eff} = \frac{f_1 S_2}{f_1 - d} \quad \text{Equation 1}$$

$$f_2 = \frac{S_2(f_1 - d)}{f_1 - d - S_2} \quad \text{Equation 2}$$

$$m = \frac{f_1(S_2 - f_2)}{f_1 S_2} \quad \text{Equation 3}$$

These equations can be used to calculate the parameters of a system for any particular values of d and $S_2$.

For the purposes of illustration it is useful to consider the operation of a system in the region where the first lens 2 focuses the light approximately onto the image plane 4, without any help from the second lens 3, i.e. where $f_1 = d + S_2$. In this region the required range of focal lengths $f_2$ of the second lens 3 is small.

To describe this region, it is easiest to first consider the situation where $f_1 = d + S_2$ and then consider the consequences of either increasing, or decreasing $f_1$ by a small amount. For $f_1 = d + S_2$, the intermediate focus of the system is on the image plane 4 and no modification of the light path is required by the second lens 3. The focal length f2 of the second lens 3 is, therefore, equal to or substantially equal to infinity. A small increase in $f_1$ would place the intermediate focus just beyond the image plane 4, therefore, requiring $f_2$ to go slightly positive to re-focus the image onto the image plane 4. Conversely, if $f_1$ is decreased by a small amount, $f_2$ must go slightly negative to compensate.

Considering a system according to FIG. 1 having the values of d and $S_2$ fixed at 150 mm and 20 mm respectively, it can be shown from equations 1 to 3 above that for a range of $f_1$ between 160 mm and 180 mm, $f_2$ will vary from −20 mm through infinity to +40 mm and that the system will produce a variation in magnification from −6 to −16, a change of magnification, at the fixed image plane, of nearly 3.

Figure 2:
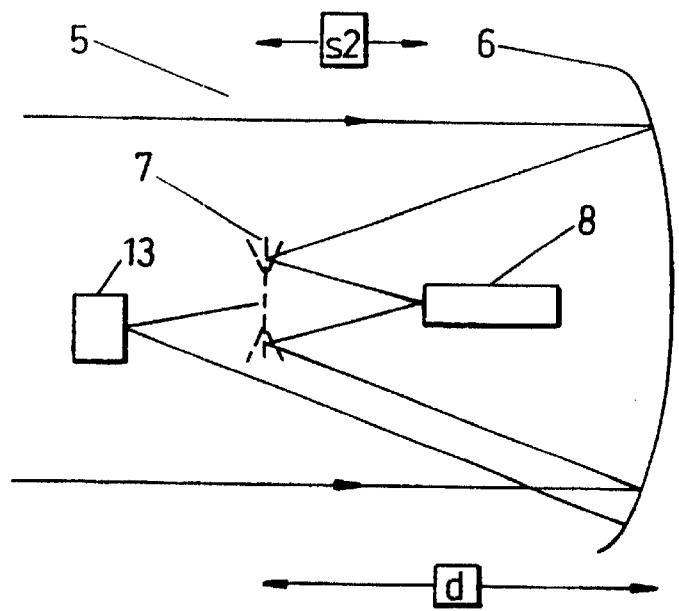
FIG. 2 shows, schematically, an alternative variable magnification optical system according to the invention in which the optical components are deformable mirrors.

The system shown in FIG. 1 can be implemented using any suitable variable focal length optical components. FIG. 2 shows a system 5 utilising two reflective optical components 6,7 arranged in a Cassegrain design. The system shown uses a large, deformable, positive primary mirror 6 to focus the light onto a smaller secondary mirror 7, placed in front of the primary mirror 6 to partially obscure the view. The secondary mirror 7 is substantially flat with the capability to deform either to create a positive, or negative focal length mirror. A detector 8 is positioned at the image plane in front of the primary mirror 6, in line with the secondary mirror 7. The system also comprises control means 13 which controls the focal length $f_2$ of the secondary mirror 7 in relation to the focal length $f_1$ of the primary mirror 6 in order to maintain the correct interrelationship between $f_1$ and $f_2$ so as to maintain focus on detector 8 for any given value of $f_1$. The control means may comprise a mechanical linkage, an electronic circuit or a computer program controlling the means used to deform the mirrors 6,7.

For a given system the required deflections of the mirror edges to produce a desired performance can be calculated from a knowledge of the diameters of the mirrors to be used and their required radii of curvature, using the following equation:

$$z = R - R\cos\left(\frac{c}{2R}\right) \quad \text{Equation 4}$$

where z is the required deflection, R is the radius of curvature of the mirror and c is the diameter of the mirror when flat, i.e. when R=∞. The radius of curvature of a spherical mirror is related to its focal length as follows:

$$R = 2f \quad \text{Equation 5}$$

Figure 3A:
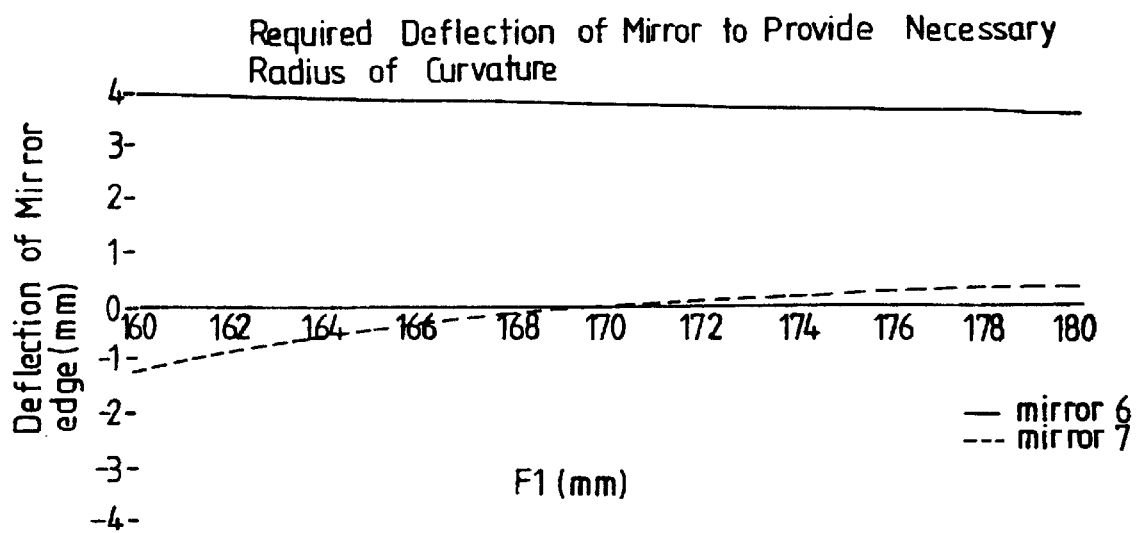
FIG. 3a shows a graph of the required mirror deflections for the system as shown in FIG. 2.
Figure 3B:
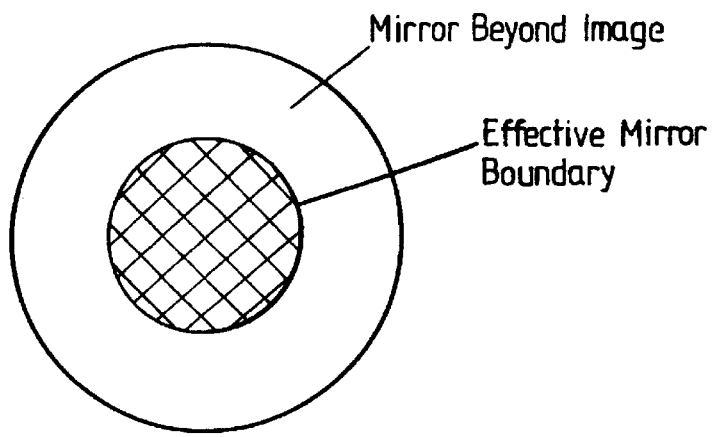
FIG. 3b shows an effective mirror boundary at the area where the image spot ends (the position of the remaining outer portions of the mirror being irrelevant so long as the portions where the image is incident are in the correct place)

FIG. 3 is a graph of the required effective boundary mirror deflections in a system according to FIG. 2 again considering the range $f_1$ between 160 mm and 180 mm and with values of d and $S_2$ fixed at 150 mm and 20 mm. The effective diameters of the mirrors are 100 mm for the primary mirror 6 and 20 mm for the secondary mirror 7. It will be appreciated that a deformable mirror typically has additional mirror surface beyond the effective boundary, and that so long as that part of the mirror that the image reflects from is in the correct configuration any additional peripheral mirror surface is irrelevant, and can be at any position.

If the figures from the graph in FIG. 3 are included with parameters calculated previously for $f_2$ and m in relation to the system shown in FIG. 1, the following numerical description of the behaviour of the system at the extremes is obtained.

| Focal length of mirror 6 mm | Focal length of mirror 7 mm | Magnification of compound system | Deflection required of mirror 6 on boundary of optical beam (in mm) | Deflection required of mirror 7 on boundary of optical beam (in mm) |
|---|---|---|---|---|
| 160 | −20 | −16 | 3.90 | −1.24 |
| 180 | 40 | −6 | 3.47 | 0.42 |

The system described above provides for a compact, versatile imaging system whilst utilising mirrors of dimensions which can provide and withstand the required deflections.

Although the above embodiments have been described by reference to the region where $f_1\_d+S_2$, the invention is not limited to application in this region but encompasses any application falling within the terms of the claims. For example in certain applications it may be desirable to completely de-focus the system. This could be achieved, for example, by adjusting the system to meet the condition that $f_1+f_2=d$.

Figure 4:
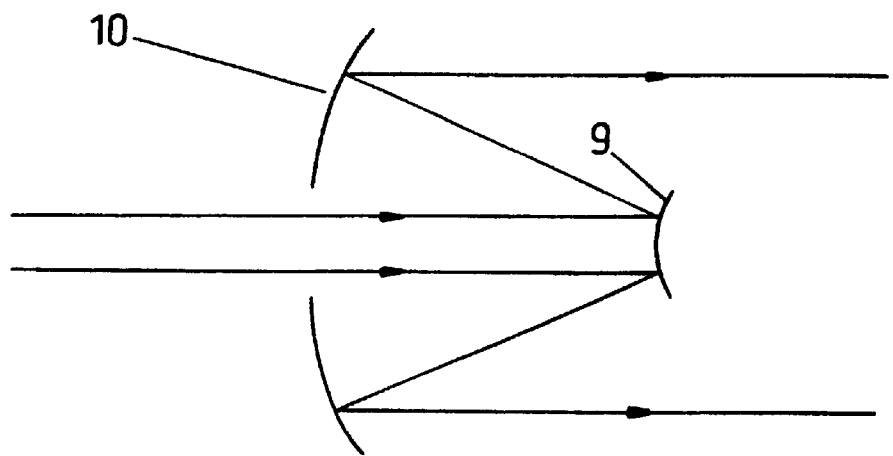
FIG. 4 shows a beam expander according to the invention comprising two optical components.

FIG. 4 shows a beam expander according to the invention. The beam expander comprises a negative primary mirror 9 and a positive secondary mirror 10 arranged in a Cassegrain system.

In the beam expander shown in FIG. 4, if the distance, d, between the mirrors is fixed then it can be shown that the focal length $f_2$ of the secondary mirror 10 is related to d and the focal length $f_1$ of the primary mirror 9 by the relationship:

$$f_2 = d - f_1 \quad \text{Equation 6}$$

and that the magnification, m, of the system is given by:

$$m = \frac{f_2}{-f_1} \quad \text{Equation 7}$$

Figure 5:
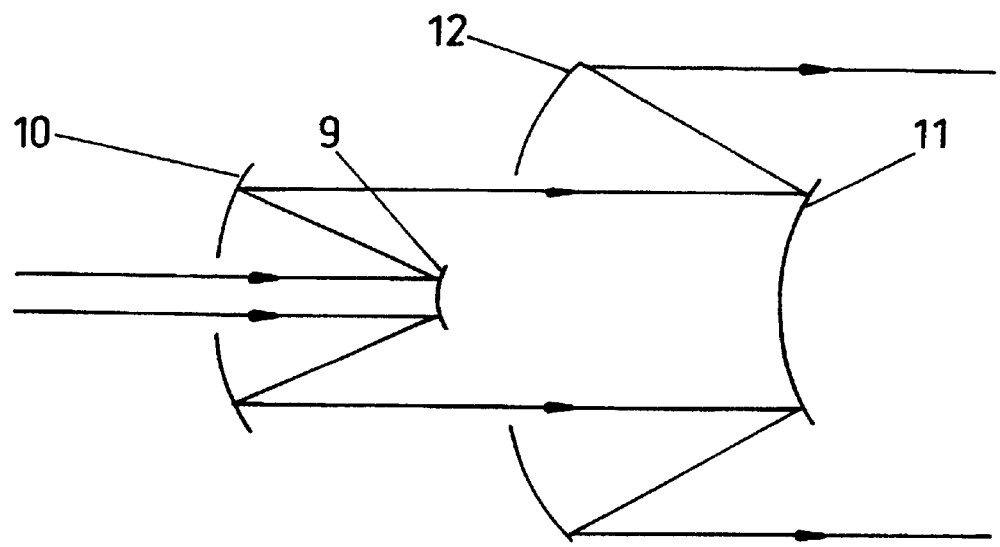
FIG. 5 shows a beam expander according to the invention comprising four optical components.

In the system shown in FIG. 4 a negative primary mirror 9 was chosen in order to provide for a positive magnification with no image inversion in accordance with equation 7. The range of magnification possible in a system according to this design is limited by the ability to produce mirrors of a suitable size which can provide and withstand the required deformations. In order to provide for wider ranges of magnification it is possible to use more than two optical components. For example, FIG. 5 shows an expander comprising four optical components 9,10,11,12 which acts like two stacked two optical element expanders. If the distances between the primary and secondary mirrors are set the same for each expander and the radius of curvature for each of the primary mirrors 9,11 and each of the secondary mirrors 10,12 is set the same then each expander will provide the same magnification and the primary mirrors 9,11 and the secondary mirrors 10,12 may then be respectively varied identically. In this type of arrangement the primary mirror 11 of the second expander may be same size as the secondary mirror 10 of the first expander.

It can be useful to have stacked optical elements (expander or focusing optics) with the stacks of substantially the same radius of curvature and spacing so that both sets of primary and secondary optics (or all sets if there are more than two sets) can be controlled using the same control signals, so there is no need to calculate and generate a separate set of control signals for the optical elements in each stack. This is, of course, achieved by selecting the geometry of the stacks appropriately and the size and focal length of the optical components appropriately.

In order to produce a similar range of magnification using a four optical component expander rather that a two optical component expander, the distances between the primary and secondary mirrors for each expander can be half that of the required distance for the two optical component expander, thus the overall length of a four optical component expander may be similar to that of an equivalent two optical component expander.

The concept of using stacked expanders can be extended to any number of stacked expanders giving wider ranges of magnification.

Figure 7:
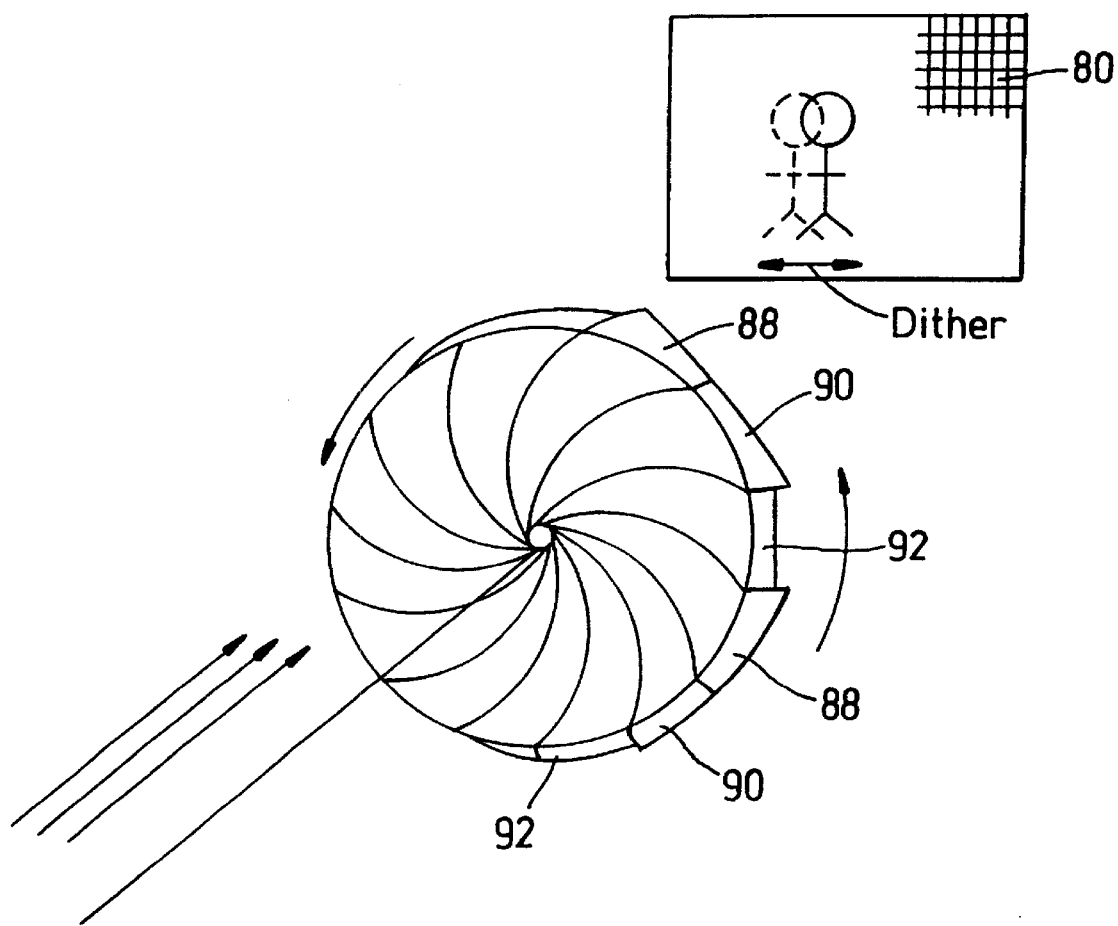
FIG. 7 shows schematically a prior art chopper for an I.R. camera.

FIG. 7 illustrates schematically a conventional infra-red thermal imaging system in which the infra-red detector elements 80 need to receive a reference signal periodically, or be relieved of the presence of the image (referenced 82) periodically. A ferroelectric array is normally A.C.-coupled and has a chopper to do this. A bolometric array is normally D.C.-coupled, but still has a chopper to provide a periodic reference signal, typically for calibration.

In either a ferroelectric or bolometric array system, a rotating mechanical chopper device 84 is typically placed in the thermal beam 86 incident from the scene being imaged. The chopper typically comprises two transparent prism sections 88 and 90 (focusing an image to offset positions) and third opaque sections 92. The opaque sections present a black body reference temperature signal to the detector. As the chopper is rotated, the detector periodically receives the reference temperature of the opaque section and this effectively resets the detector. A disadvantage of this system is that the temperature of the opaque section is indicative of the temperature of the imaging system, and not of the scene being imaged. It can be seen that the imaging system of the present invention overcomes such a disadvantage, the reference temperature signal used therein being a de-focused image of the scene and, therefore possibly being indicative of or related to the average temperature of the scene.

The optical system may have one of the first or second optical components provided as a substantially flat mirror (or lens) which can be manipulated to have a positive or negative curvature, and which can preferably move from positive to negative curvature and back again, under the control of control means. Said one mirror (or lens) may be significantly smaller than the other of said first and second optical components. It may be 50% of the diameter or less, or 30% or less, or 20% or less, or 15% or less.

Figure 6:
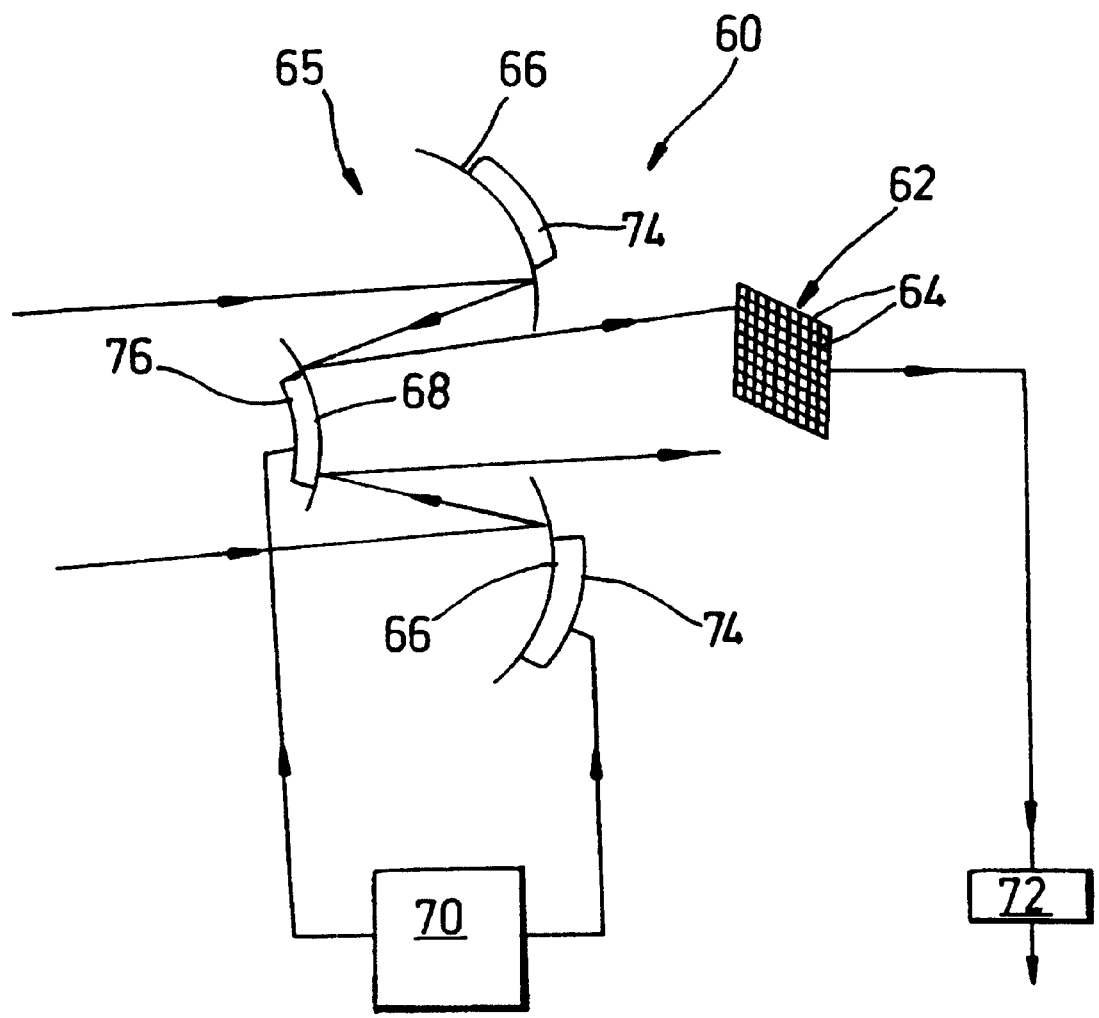
FIG. 6 shows schematically an infra-red imaging camera.

FIG. 6 shows schematically an infra-red thermal imaging system comprising a camera 60 comprising a detector array 62 of pixels 64; an optical unit 65 comprising a primary mirror 66 and a secondary mirror 68; and controller 70. A lens unit housing is provided, but not shown. Signals from the detector array 62 are fed to a signal processing unit 72. Mirror perturbation/distortion means 74 and 76 are provided to control the shape and configuration of the mirrors 66 and 68, under the control of the control means 70.

The primary mirror is controlled, in combination with the secondary mirror 68, to achieve a desired magnification of the image as described earlier. This may typically be ×10, or ×15, or so, or anywhere in the rage ×1 to ×10 or ×20.

The system is chopperless. The function of the chopper is performed by the variable mirrors 66 and 68. In this example mirror 68, the smaller secondary mirror, is alone moved by the distortion means 78 to achieve a dither of the image on the detector (A.C.-couple the detector signals). This is typically achieved by moving the image bodily on the detector, for example whilst still in focus by, for example, a few pixels. It is easier to move the smaller mirror, and movements of the smaller optical element can be made faster. Alternatively the image may be de-focused, and dithered in de-focused mode.

Mirror 68 is also distorted/moved, possibly alone or in combination with mirror 66, so as to de-focus the image. The image may be periodically de-focused, de-focused from time to time, or may be generally de-focused all of the time, possibly with exceptions. This removes the focused incident light from the pixels 64. In a conventional choppered system, the pixels would receive substantially black body radiation from the chopper/camera. In this embodiment the pixels 71 receive radiation from the scene, but deliberately de-focused. When the scene is substantially totally de-focused the pixels receive signals indicative of the mean scene temperature.

Figure 9:
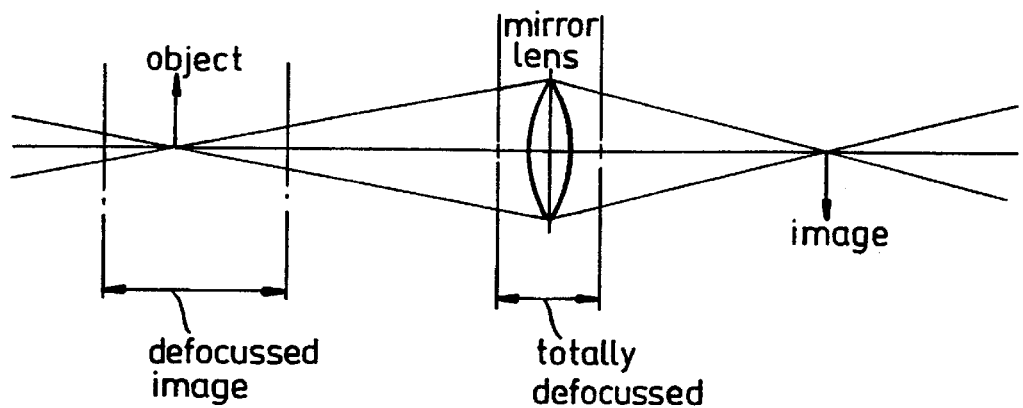
FIG. 9 shows schematically the difference between a de-focused image and a totally de-focused image.

FIG. 9 illustrates the fact that the system may substantially totally de-focus the scene image so that substantially no spatial information is present in the beam incident on the detector array—each pixel receives substantially the same intensity light. Although the paper by Butler et al referred to earlier says that this might be achieved by having a thick transparent section in the mechanical chopper, it is difficult to see how, for a pixel array of thousands of pixels, say, 256×256 pixels, or 512×512 pixels, any practical chopper can be made thick enough to totally blur the image to the extent necessary to have every pixel receiving substantially the same intensity light. The chopper would be enormously thick.

FIG. 9 also illustrates a de-focused image regime, where it is still possible to tell that there is an image, and where on the sensor array it is, approximately, but it is not a sharp image, and is of lower intensity than if it were focused. It may be possible to track a de-focused image (but not a totally de-focused image) and it may be possible to evaluate where the centre of the de-focused image is.

Of course, it is possible to control the mirrors to direct the incident light away from the detector, getting closer to directly reproducing the effect of a chopper.

The mirrors 68 and/or 66 may be controlled so as to present a reference signal or image to the detector from time to time, possibly at predetermined regular intervals. This reference may be the substantially totally de-focused scene image, and may give a mean scene temperature reference.

It will be appreciated that it may only be necessary to provide one mirror (or in other embodiments optical element such as a lens) to provide dither and/or de-focus, especially if zoom is not required. Zoom may be achieved by a more conventional mechanism and dither and/or de-focus by a controlled mirror (or optical element).

It will also be appreciated that in an infra-red imaging system we may use variable controllable transmissive lenses instead of mirrors, or a mixture of variable transmissive and reflective variable optical elements.

It will be appreciated that the deformable mirror 7 in FIG. 2 can be used in an I.R. imaging system to provide an accurate and fast tracking mechanism which can keep an area of the obscured scene of interest centred in the image field during a zoom procedure, and can also be used for tracking a moving object (and also to compensate for jitter, or movement of a platform upon which the system/camera is mounted).

As discussed elsewhere, the two mirrors (optical elements) can be driven together to produce a large, but controllable, deformation that can be used to achieve A.C. coupling of the detectors (e.g. thermal infra-red detectors), and/or for mean scene temperature referencing in thermal imaging.

In the embodiments described above only the basic design requirements have been outlined. These designs can be varied to include modified components to correct for aberrations as is known in the art. Such modified components may, for example, include parabolic or elliptical mirrors, or refractive or diffractive elements.

Variable focal length optical components for use in a system according to the invention can be produced for example by using deformable mirrors, refractive optical components, liquid crystals and non-linear optical effects, but any variable focal length optical components can be utilised in a system according to the invention. If refractive optical components are used these could be of the inflatable type which can be at least partially filled with a high refractive index fluid, the optical power of the element being varied by increasing or decreasing the amount of said fluid in the element. Alternatively an elastic lens similar to the human eye could be used, wherein the lens curvature is increased by applying a radial compression.

The invention may be used in infra-red imaging system, on I.R. sensors, or optical cameras (possibly CCD cameras, and/or video cameras) telescopes, binoculars, and other areas.

The use of all-reflective optics, with substantially no (or no) refractive optics provides a system with greater hyper-spectral applications. The system will transmit over a wide spectral bandpass, and have a common focal plane at all operational wavelengths. This compares with the refractive systems, for which it is difficult to find a material which has good transparency over the whole spectral range, including visible, near, mid, and thermal infra-red.

In refractive systems it is necessary to have doublets or triplets that are generally designed to be achromatic in the sense that their focal plane is the same at just two or three design wavelengths, and then differs as little as possible for other wavelengths in the chosen working region. This effect can be exacerbated when using zoom/high magnification facilities. For example, even television cameras when using extensive zoom can have a change in the colour of the image.

The above advantage can be used in infra-red imaging detectors, collimators, beam expanders, and indeed in visible optic systems such as telescopes, cameras and binoculars.

The use of the deformable surfaces (optical elements) is well suited to a two-axis tilt system which is provided on one or more of the deformable surfaces. The purpose of a two-axis tilt system is typically to ensure that the optical axis of a zoom lens is maintained during the zoom function (compensation of image wander). Such control is difficult to implement in a refractive system without adding further optical components and hence introducing further image aberrations and increasing the weight/complexity. It is an elegant solution to be able to use the same reflective variable focus components that perform the zoom to perform the compensation. This applies to any wavelength system, including visible and infra-red. Using the same first and second optical elements as are used for zoom to compensate for other things, such as camera shake, centring the image during zoom, aberration, beam steering, etc. is an elegant solution. Similarly, it is elegant to use the same variable focal length components to provide dither and a reference signal in an infra-red camera, or an infra-red detector.

A particular interesting application is that in thermal imaging systems it may be possible to distort the mirror to use one or two axis tilts as a mechanism for switching into the detector field of view one or more thermal reference sources that may be used for system calibration.

It will be appreciated that it is possible to control one (or more) of the reflective optical elements (mirrors) in an infra-red imaging system to switch into a reference source mode, as well as provide a dither and/or provide a de-focused image to the detector. The de-focused image may be the reference.

In all applications where microscan is to be used to increase the image resolution by post-processing, or to be used with an A.C. coupler detector, the implementation of fine-control, two axis pointing can be used, in combination with a zoom function if required. Again, the same optical components (refractive or reflective) can be used to perform the microscan, zoom and to perform the two axis pointing along the beam being detected/imaged.

As has been previously discussed, within the design of the reflective zoom system it is relatively easy to change the curvature of one deformable surface so as to produce a substantial and rapid shift in image focus without the need to move any optical component bodily. Because of the speed of operation and the substantial nature of the focus shift that may be implemented, such control may be exploited in a number of ways.

Figure 8:
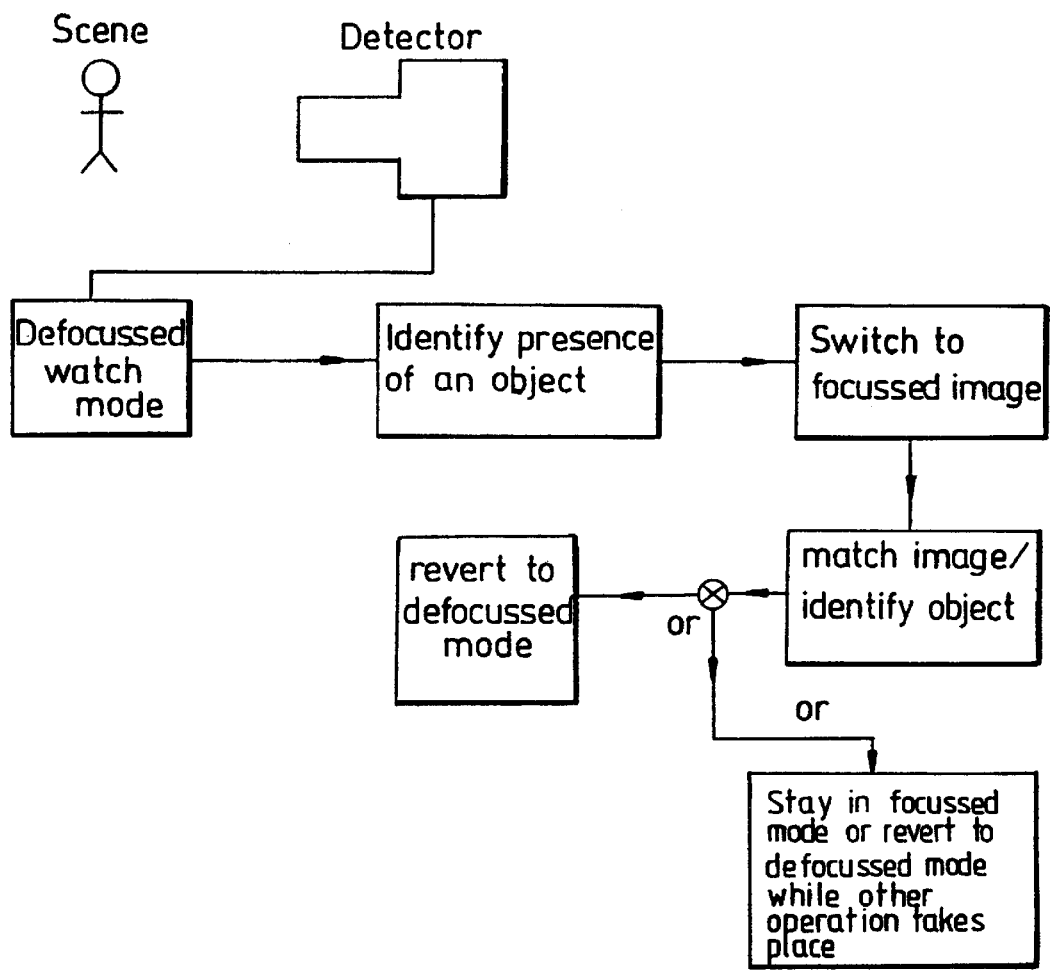
FIG. 8 shows schematically the operation of an infra-red imaging system.

Firstly, in all imaging systems (of any wavelength) it may be desirable to minimise the possibility of a retro-reflection from the detector surface, and the image may be de-focused by a controllable amount during routine operation. Thus, a detector does not normally receive a focused image but rather a slightly de-focused image. This reduces the retro-reflective strength by spreading the reflective radiation over an increased and controllable angular range. The use of spectral, polarisation, or other forms of discriminant in a de-focused image may be used to detect the presence of an object sought in the image. Only when the object sought in the image is to be confirmed as indeed an object of the desired class, need the system be focused and zoomed to provide the high-quality image required for image recognition and identification of the object to be sought. This is schematically illustrated in FIG. 8. After locating a positive match for the object/identifying it, the imaging system may be coupled to other operational systems. It may be possible to track a tagged object whilst in de-focused mode.

The system may always keep the image de-focused to some degree.

Thus, an imaging system may have a de-focused mode of operation during routine operation, with reduced retro-reflection from the detector surface, and then when the detected image signal, which is processed, identifies the presence of an object, possibly of a predetermined class of objects (and possibly not), the system may focus the image and possibly also zoom in on the image/on the object to provide a much higher quality image. This higher quality image, and possibly enlarged image, may then be used by the system for pattern recognition/object identification. For example, it may be compared with a series of reference images in, for example, a pattern recognition correlator.

By having a de-focused image during normal operation, unexpected flashes of light may damage the individual detectors/pixels less than would be the case with a focused image, and as mentioned above, the retro-reflection from the detector surface is minimised.

A second application is where the detector is vulnerable to damage by an unexpected flash, for example lightening or a laser. Again, the system may be de-focused to reduce the energy density at the detector surface.

Where the system is used at less than the maximum zoom and the detector pixel size is larger than the optical resolution of the system, the de-focus may be chosen to match the pixel-defined resolution. The system in which the detector pixel provides defraction-limited resolution at, for example 5×zoom could be operated at, for example 1×zoom, with a de-focus that increased the area of focus spot by a factor of 25, with a corresponding reduction in energy density in the focus beam. This can be used to protect the detector. The de-focus may be the square of the zoom factor. It may be desirable to de-focus to reduce the intensity by a factor of the order of 50 or more, or of the order of 100 or more.

Figure 10:
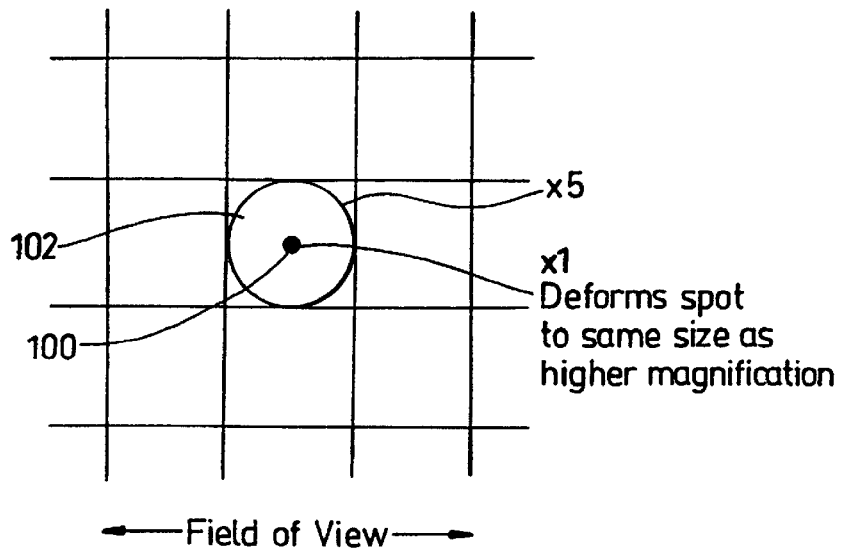
FIG. 10 shows schematically how a system operating at low magnification can be run in a de-focused mode without significant image degradation.

FIG. 10 shows how a small intense beam spot 100 can be de-focused to fill (or substantially fill) the pixel without significant loss of resolution: the pixel still receives the same amount of light, and still emits substantially the same signal with de-focus, but the intensity of light on the pixel surface is reduced, and this may prevent the pixel surface from becoming damaged by too intense a spot. The wider field of view of the lower magnification is maintained.

In all applications where the detector duty cycle is less than 100%, the system may be fully de-focused at all times when the detector is not integrating a signal (i.e. is not in effective use). This provides both reduced retro-reflection and reduced vulnerability to unexpected high intensity flashes.

In many I.R. imaging sensors (and visible electronic cameras) the scene-coupling ability of the system is not the limiting factor to read out/display/detection. A scene image may be captured by a detector array in, say, 20 ms, but it can take three times that long to read out the values from the detector pixel array—the "eye" of the system is only needed for a fraction of the overall time. However, if the "eye" remains open the pixel detectors are vulnerable to damage from too bright flashes. It is proposed to de-focus the image incident on the detectors when they are not integrating a signal (or possibly even divert the image elsewhere).

The above applications are viable because of the speed and flexibility afforded by the reflective system over and above refractive systems.

Refractive optical elements are generally heavier than the reflective equivalent, and thus the use of a reflective zoom provides a system of reduced mass compared to its refractive counterpart.

A further advantage of reflective systems over refractive systems is that in thermal imaging systems Germanium, Zinc Selenide and other transparent materials used to manufacture transmissive elements typically have a transparency of about 90%. Replacement of one or more of those elements with a reflective element (for example having a Gold coating) can produce a reflector with an efficiency of 99%

(or about that), and can thus lead to a useful increase in overall system transmission. An-all reflective optic system would have even more advantages.

It will be appreciated that it is possible to change the first optical component (e.g. mirror) and/or the second optical component (e.g. mirror) from having one of a positive or negative focusing power to the other of a positive or negative power, in use, possibly whilst changing the magnification of the image.

The control means may be a microprocessor or computer. It may be programmable. The user may be able to change the program that is operating at any particular time—i.e. user-selectable programme.

Although this specification discusses pixellated detector arrays, and these would typically have hundreds and thousands of pixels, it is envisaged that non-pixellated detectors would benefit from the invention and it is intended to protect those. Furthermore, a detector, as opposed to an imager, may have just a single detection "pixel", or no imaging function, and again protection is sought for the application of the present invention in that area. The definitions of protection should be interpreted accordingly.

What is claimed is:

1. An infrared imaging system for providing a variable IR image, said system comprising:
    an infrared detector; and
    an optical system for directing the image onto said infra-red detector, said optical system comprising:
        at least first and second variable focal length reflective optical components whose positions are fixed relative to one another, and
        control means for varying the focal length of the first and second variable focal length optical components to direct the image onto the detector in a controlled manner.

2. An imaging system according to claim 1 in which the control means is capable of controlling the first and second optical components so as to provide a focused image on the detector whilst altering the magnification of the image.

3. An imaging system according to claim 2, which comprises means for relieving the detector of the focused scene image.

4. An infrared imaging device according to claim 1, in which at least one of the first and second optical components is controlled by the control means to de-focus the image incident upon the detector.

5. An imaging system according to claim 4 in which the de-focused image is substantially completely de-focused so as to be indicative of a mean scene temperature of the image.

6. An imaging system according to claim 5 in which the mean scene temperature is used as a reference.

7. An imaging system according to claim 1, which comprises dither means adapted to dither the image focused onto the detector between different dither positions on the detector.

8. An imaging system according to claim 7 in which the dither means comprises one of the first and second optical components controlled by the control means.

9. An imaging system according to claim 1 in which the control means ensures that for a substantial part of the duty cycle of the detector array the image incident upon the detector is significantly de-focused.

10. An imaging system according to claim 1 in which the first and second reflective optical components are both adapted to have their focal lengths varied by one of deflection and distortion.

11. An imaging system according to claim 1 in which at least one of the first and second optical components are controlled by the control means so as to compensate for aberration and/or vibration.

12. An imaging system according to claim 1 in which the only focusing elements are the first and second variable focal length optical components.

13. An imaging system according to claim 1 in which the first and second optical components are operatively stacked with at least third and fourth variable focal length optical components so as to increase the magnification that can be achieved by the system.

14. An imaging system according to claim 13 in which the first, second, third, and fourth optical components are all reflective.

15. An imaging system according to claim 13 in which the third and fourth optical components have substantially the same focal lengths as the first and second optical components respectively, and are controlled by the control means as are the first and second components.

16. An imaging system according to claim 1 in which the first and second components and the detector are arranged in the Cassegrain arrangement.

17. An imaging system according to claim 1 which has control means adapted to control the first and second optical elements so as to operate the system in a de-focused mode of operation at times and in which the control means is adapted to determine when a possible object of a predetermined class is present in the image and dependent upon establishing that it is adapted to operate the system in a focused mode of operation so as to have an image focused upon the detector, and adapted to identify the object using the detected focused image.

18. An imaging system according to claim 17 which is adapted to return to the de-focused mode of operation once an object has been identified.

19. An imaging system according to claim 1 capable of zooming the magnification of the image incident upon the detector and in which the control means is adapted to operate the system at a first, lower, magnification state and a second, higher, magnification state, and in which the control means operates the system at the first, lower, magnification state with the image de-focused to increase the area of any nominal focused area, thereby preserving the larger field of view of the lower magnification state but ensuring that energy density from a point source is equivalent to the higher magnification state.

20. An imaging system according to claim 19 in which the de-focus is by a factor which takes the resolution of the optical components of the system to about the resolution of the overall output of the display, so as to avoid significant image degradation.

21. An imaging system according to claim 1 in which the image is arranged to be de-focused at substantially all times that the detector is not integrating a signal.

22. An imaging system according to claim 1 at least one of said first and second optical components comprise a substantially flat mirror responsive to manipulation by distortion means under the control of the control means to focus incident light on a fixed image plane by moving the mirror so as to produce either a positive or a negative focusing power.

23. An imaging system according to claim 22 in which the mirror can be moved from having a positive focusing power to having a negative focusing power.

24. An imaging system according to claim 22 in which one substantially flat mirror is significantly smaller than the other of said first and second mirrors.

25. An optical system comprising:
- at least two variable focal length reflective optical components whose positions are fixed relative to one another; and
- control means for varying the focal length of said at least two variable focal length reflective optical components to control an image passing through said system.

26. An optical system according to claim 25 which operates over a spectral range, for example between 450 nm to 10,000 nm.

27. An optical system according to claim 26 which has substantially the same focal plane for all wavelengths over which it operates.

28. An optical system according to claim 25 which comprises an image plane fixed relative to the variable focal length reflective optical components.

29. An optical system according to claim 25 in which the reflective optical components are also used to stabilise an optical beam incident on the system.

30. An optical system according to claim 25 in which variation of the focal lengths of the reflective optical components is carried out at speeds of 10 Hz or above.

31. An imaging system comprising an image detector and an optical system according to claim 25.

32. An optical system for varying the width of an optical beam incident on the system, comprising:
- at least two variable focal length optical components whose positions are fixed relative to one another; and
- control means for varying said at least two variable focal length optical components such that the width of said optical beam is varied whilst substantially maintaining any collimation of said optical beam.

33. An optical system according to claim 32 in which the optical components comprise reflective optical components.

34. A method of dithering an image between first and second positions on an imaging detector, the method comprising the steps of:
- controlling a variable focal length optical device upon which radiation is incident so as to direct an image to one position on an imaging detector,
- distorting the device so as to direct the image to a different position on said imaging detector, and repeating the controlling and distorting steps so as to repeatedly dither the image on the imaging detector.

35. A method according to claim 34 in which the optical device is controlled so as to direct de-focused radiation from the scene to the imaging detector.

36. A method according to claim 35 in which the de-focused radiation is substantially completely de-focused so as to present mean scene radiation to the detector.

37. A method according to claim 36 in which the mean scene radiation is periodically directed on the detector and is used as a reference in processing detected signals from the detector array.

38. A method according to claim 34 in which the optical device is part of focusing optics and is also used at times to focus the image onto the imaging detector.

39. A method according to claim 38 in which the optical device is part of zoom magnification optics and is used at times to zoom the magnification of the image incident upon the imaging detector.

40. A method according to claim 34 comprising providing another focusing optical element in addition to the optical device and having the optical device, the optical element and imaging detector at fixed distances from each other, zoom being achieved by varying the focal length of the optical element and the optical device.

41. A method according to claim 40 in which the optical element is bigger than the optical device and is moved or perturbed less often, or at least a slower rate, than is the smaller optical device.

42. A method according to claim 40 in which radiation is incident upon the optical element before it is incident upon the optical device.

43. A method according to claim 34 in which the optical device is also used to compensate for vibrations or movement of an imaging device.

44. A method of providing a periodic reference signal in an electronic imaging detector, said method comprising the steps of:
- operating the detector in a mean scene radiation mode from time to time by varying a focal length of a variable focal length optical device to change its focal length so that radiation incident upon the imaging detector is uniform and has substantially no spatial information,
- using a signal produced by the detector during this mean scene radiation mode of operation as a mean scene reference signal, and
- controlling the focal length of the device to return to an imaging mode of operation after the reference has been obtained.

45. A method according to claim 44 in which the detector switches to mean scene reference mode with a regular periodicity, preferably of the order of many times per second.

46. A method of minimising damage to detectors in an optical system and retro-reflection from an optical detector system, the method comprising the steps of:
- operating variable focus optical components of the system in a de-focus mode by varying the focal length of said optical component such that the captured radiation incident upon a detecting element is significantly de-focused.

47. An infrared imaging system for providing a variable IR image, said system comprising:
- an infrared detector; and
- an optical system for directing the image onto said infra-red detector, said optical system comprising:
  - at least first and second variable focal length reflective optical components whose positions are fixed relative to one another, and
  - control means for varying the focal length of at least one of said first and second variable focal length optical components in relation to the focal length of the other of the said variable focal length optical components such that, in use, control over at least two optical parameters of the optical system is achieved, and in which said at least one of the first and second optical components are adapted to be adjusted by one of distortion and deflection in order to vary their focal length, wherein the first and second optical components are operatively stacked with at least third and fourth variable focal length optical components so as to increase the magnification that can be achieved by the system and the third and fourth optical components have substantially the same focal lengths as the first and second optical components, respectively, and are controlled by the control means as are the first and second components.

* * * * *